US005405903A

United States Patent [19]

Van Westrenen et al.

[11] Patent Number: 5,405,903

[45] Date of Patent: Apr. 11, 1995

[54] PROCESS FOR THE PREPARATION OF A BLOCK COPOLYMER BLEND

[75] Inventors: Jeroen Van Westrenen; Jacqueline M. Veurink; Arie Van Dongen; Antonius A. Broekhuis, all of Amsterdam, Netherlands

[73] Assignee: Shell Oil Company, Houston, Tex.

[21] Appl. No.: 208,414

[22] Filed: Mar. 9, 1994

[30] Foreign Application Priority Data

Mar. 30, 1993 [EP] European Pat. Off. ............ 93200909

[51] Int. Cl.⁶ ..................... C08L 53/02; C08F 297/04
[52] U.S. Cl. ........................................ 525/89; 525/314
[58] Field of Search ................................ 525/89, 314

[56] References Cited

U.S. PATENT DOCUMENTS

| | | | |
|---|---|---|---|
| 4,096,203 | 6/1978 | St. Clair | 525/314 |
| 4,335,221 | 6/1982 | Gerberding | 525/89 |
| 4,391,949 | 7/1983 | St. Clair | 525/99 |
| 4,704,434 | 11/1987 | Kitchen et al. | 525/250 |
| 5,130,377 | 7/1992 | Trepka et al. | 525/314 |
| 5,256,736 | 10/1993 | Trepka et al. | 525/314 |
| 5,284,915 | 2/1994 | Custro et al. | 525/89 |

FOREIGN PATENT DOCUMENTS

| | | | |
|---|---|---|---|
| 0238135A | 9/1987 | European Pat. Off. | 525/89 |
| 0242614 | 10/1987 | European Pat. Off. | |
| 0436225 | 7/1991 | European Pat. Off. | |
| 63-66254 | 9/1986 | Japan | 525/89 |

*Primary Examiner*—James J. Seidleck
*Assistant Examiner*—M. L. Warzel
*Attorney, Agent, or Firm*—Keith M. Tackett

[57] ABSTRACT

A process is provided for preparing block copolymer blend compositions, which process comprises the subsequent steps of polymerizing vinyl aromatic monomer, adding conjugated diene monomer to the polymerization mixture, adding more initiator, adding of a second portion of conjugated diene monomer, adding a second portion of vinyl aromatic monomer, and adding a terminating agent. A block copolymer composition is provided having a blend of a triblock copolymer A-B-B'-A' and a diblock copolymer B'-A'.

7 Claims, No Drawings

PROCESS FOR THE PREPARATION OF A BLOCK COPOLYMER BLEND

FIELD OF THE INVENTION

The present invention relates to a process for the preparation of a block copolymer composition and to block copolymer compositions obtainable by this process.

BACKGROUND OF THE INVENTION

From U.S. Pat. No. 4,096,203 a process for the preparation of a block copolymer composition for use in adhesive compositions is known, which process involves in the first two steps the preparation of a lithium terminated monoalkenyl arene(A)-conjugated diene(B) diblock copolymer AB—Li by means of solution anionic polymerization. In the third step the AB—Li diblock copolymer subsequently is reacted with a coupling agent in such amount and under such conditions that the coupling efficiency of the process is varied within the range of from 20 to 80%, thereby controlling the cohesive strength of the adhesive composition wherein the block copolymer composition is to be applied. Said U.S. patent discloses three possible methods for controlling, i.e. reducing, the coupling efficiency, namely (1) underdosing of the coupling agent, i.e. adding less coupling agent than the stoichiometric amount required for complete coupling of the living block copolymers;

(2) premature addition of terminating agent; and (3) performing the coupling reaction at elevated temperatures, so that thermal termination of a part of the living block copolymers occurs.

If the coupling agent is a difunctional coupling agent such as e.g. dibromoethane, it will be appreciated that controlling the coupling efficiency in fact means controlling the ratio between triblock and diblock copolymer in the final block copolymer composition. However, controlling this triblock/diblock copolymer ratio by the above described methods is not very precise and cannot offer the desired optimum flexibility. An important factor in this respect is the fact that every coupling agent has a maximum coupling efficiency lower than 100%. Consequently, it is only possible by any of the methods described above to accomplish a coupling efficiency which is lower than the maximum coupling efficiency of the coupling agent employed. This considerably limits the range within which the triblock/diblock copolymer ratio can vary.

Morever, commonly applied difunctional coupling agents such as dibromoethane cause the coupled product to have a relatively poor color stability.

Hence, it is an object of the present invention to provide a process for the preparation of a block copolymer composition comprising a linear vinyl aromatic-conjugated diene triblock copolymer and a vinyl aromatic-conjugated diene diblock copolymer, wherein the weight ratio between triblock and diblock copolymer may have any desired value. It is a further object to provide a process wherein a very effective and high level of controllability of the weight ratio between the tri- and diblock copolymer in the composition on the one hand and their respective molecular weights on the other hand can be achieved in order to obtain tailor made polymer compositions having the desired properties. It is also an object of the present invention to provide a process for preparing a block copolymer composition which has very good color stability.

Another obvious process for preparing a block copolymer composition comprising a triblock copolymer and a diblock copolymer, both being derived from a vinyl aromatic monomer and a conjugated diene, is physically blending the triblock and diblock copolymer, which have been prepared independently. However such process would require large blending capacity and therefore is undesired. Moreover, it will be appreciated that the separate preparation of the tri- and diblock copolymer makes it extremely difficult to accomplish that the vinyl aromatic polymer block of the diblock copolymer is substantially identical to one of the terminal vinyl aromatic polymer blocks of the triblock copolymer.

Therefore, beside the fact that the present invention aims to prepare both triblock and diblock copolymer in one process, it is also an object of the present invention to provide a block copolymer composition wherein the vinyl aromatic polymer block of the diblock copolymer is substantially identical to at least one vinyl aromatic endblock of the triblock copolymer.

From U.S. Pat. No. 4,335,221 a composition of linear triblock copolymers having a monovinyl aromatic content of 70-80% by weight and a conjugated diene content of 20-30% by weight is known, prepared by a reinitiation process comprising three process stages:

(1) polymerization of 40 to 80% by weight of the total monovinyl aromatic monomer to be used in an inert solvent in the presence of a monolithium-hydrocarbon initiator until the monomer has been substantially completely converted;

(2) adding the remaining amount of initiator, adding a further amount of 15 to 30% by weight of monovinyl aromatic monomer to be used and polymerizing until the monomer has been substantially completely converted; and finally (3) adding a mixture of all conjugated diene monomer to be used and the remaining amount of monovinyl aromatic monomer and polymerizing until complete conversion of the monomers, followed by the addition of a protonactive compound in order to terminate the polymer chains formed.

As the rate of polymerization of a conjugated diene is in general greater than that of a monovinyl aromatic compound if both are present in one reaction mixture, it will be appreciated that in step (3) a tapered polymer block is formed. As a result, all block copolymers which are present in the polymer composition have a terminal tapered copolymer block.

European Patent Application No. 0,242,614 discloses a multistage solution polymerization process for producing a mixture of several monovinyl aromatic-conjugated diene block copolymers, each having a terminal tapered copolymer block and a monovinyl aromatic content between 55 and 95% by weight. Said process comprises five subsequent polymerization stages, whereby the polymerization reaction in each stage is allowed to proceed until substantially no free monomer is present anymore. Said five stages are:

(1) initiator and monovinyl aromatic monomer, (2) initiator and monovinyl aromatic monomer, (3) conjugated diene monomer, (4) initiator and monovinyl aromatic monomer, and (5) conjugated diene monomer and monovinyl aromatic monomer.

The polymer blends prepared according to the above described multiple initiation processes are rather hard products due to the relatively high content of monovinyl aromatic compound. Such blends are useful in products requiring good craze-resistance, little colour and a high degree of transparency.

The present invention, however, aims to provide a polymer composition of two linear block copolymers, which is elastic and which can be suitably applied in e.g. adhesive formulations and which can be prepared in one process without needing any blending equipment. It will be appreciated that this is very attractive from an economical point of view. It is a further object of the present invention to provide block copolymers having a narrow molecular weight distribution of the vinyl aromatic polymer block. In this connection it is noted that the polymer compositions of the before-mentioned prior art multiple initiation processes are described to have a polymodal molecular weight distribution, whereby the initially formed monovinyl aromatic polymer blocks have different molecular weights due to reinitiation during the formation of said monovinyl aromatic blocks.

All the before-mentioned objects have been met by the process according to the present invention.

SUMMARY OF THE INVENTION

The present invention includes an improved process for the preparation of a block copolymer composition comprising two linear vinyl aromatic-conjugated diene block copolymers, said process comprising different initiation steps, and compositions obtainable by this process. The improvement comprises the addition of an initiator during the polymerization of the conjugated diene.

DETAILED DESCRIPTION OF THE INVENTION

The present invention includes to a process for the preparation of a block copolymer composition, which process comprises the subsequent steps of:

(1) polymerizing vinyl aromatic monomer in an inert hydrocarbon solvent in the presence of an organolithium initiator until substantially complete conversion;

(2) adding conjugated diene monomer to the polymerization mixture and allowing said conjugated diene monomer to polymerize until substantially complete conversion;

(3) adding a second portion of organolithium initiator, directly followed by the addition of a second portion of conjugated diene monomer and allowing said conjugated diene monomer to polymerize until substantially complete conversion;

(4) adding a second portion of vinyl aromatic monomer and allowing said vinyl aromatic monomer to polymerize until substantially complete conversion; and (5) adding a terminating agent.

After the polymerization has been terminated, the obtained product can be isolated, e.g. by steam stripping or flash evaporation.

With the expression "until substantially complete conversion" as used throughout the present specification in connection with the different polymerization reactions involved, is meant that a polymerization is allowed to proceed until at least 90%, preferably at least 95% and most preferably at least 98%, of the initially charged monomer has been polymerized.

It will be appreciated that the process according to the present invention results in a block copolymer composition comprising a triblock copolymer and a diblock copolymer whereby the vinyl aromatic polymer block of the diblock copolymer is substantially identical to the last formed vinyl aromatic polymer block of the triblock copolymer. The term "substantially identical" as used in this connection means that the molar weight ratio between vinyl aromatic polymer block of the diblock copolymer and the last formed vinyl aromatic polymer block of the triblock copolymer is within the range from 0.9 to 1.1, more suitably 0.95 to 1.05 and most suitably is equal to 1.

The above described process may be illustrated by the following reaction scheme wherein $A_i$ represents a poly(vinyl aromatic) block, $B_i$ represents a poly(conjugated diene) block and the index number i indicates the process step in which a polymer block is formed:

| | | |
|---|---|---|
| Step (1): | $A_1$—Li | (first initiation) |
| Step (2): | $A_1$—$B_2$—Li | |
| Step (3): | $A_1$—$B_2$—$B_3$—Li     + $B_3$—Li | (second initiation) |
| Step (4): | $A_1$—$B_2$—$B_3$—$A_4$—Li    + $B_3$—$A_4$—Li | |
| Step (5): | $A_1$—$B_2$—$B_3$—$A_4$    + $B_3$—$A_4$ | (termination) |

It will be appreciated that the conjugated diene blocks $B_2$ and $B_3$ can be regarded as one conjugated diene polymer block, if they are bonded together to form the polymer unit $B_2$-$B_3$. Consequently, the block copolymer designated as $A_1$-$B_2$-$B_3$-$A_4$ should be regarded as a triblock copolymer.

In a preferred embodiment of the process according to the present invention the amount of conjugated diene added in step (3) is such that the molar weight ratio between the polymer blocks $B_3$ and $B_2$-$B_3$ as expressed in the reaction scheme of is in the range of from 0.3 to 0.7, more preferably 0.4 to 0.6 and even more preferably 0.45 to 0.55. Most preferably however, said weight ratio is equal to 0.5, which implies that the molar weights of the polymer blocks $B_2$ and $B_3$ are identical. In the event said molar weight ratio is 0.5, the total amount of conjugated diene added in step (3) must be larger than the amount of conjugated diene added in step (2), as a certain part of the conjugated diene added in step (3) will also form polymer blocks $B_3$ of the final diblock copolymer $B_3$-$A_4$.

It will be appreciated that the process according to the present invention enables the preparation of a block copolymer composition wherein the vinyl aromatic contents of both triblock and diblock copolymer are either the same or different. It is preferred that they are the same.

In principle, any desired weight ratio between tri- and diblock copolymer can be accomplished by the process according to the present invention. It is however preferred that this ratio lies within the range of from 0.01 to 100, preferably 0.1 to 50 and even more preferably 0.2 to 20.

The vinyl aromatic monomer may be selected from styrene, a-methylstyrene, α-methylstyrene, p-methylstyrene, p-tert-butylstyrene, 1,3-dimethylstyrene or mixtures thereof, of which styrene is the most preferred.

The conjugated diene monomer may be any conjugated diene containing from 4 to 8 carbon atoms, such as 1,3-butadiene, 2-methyl-1,3-butadiene (isoprene), 2,3-dimethyl-1,3butadiene, 1,3-pentadiene, 1,3-hexadiene or mixtures thereof, of which 1,3-butadiene, isoprene or mixtures thereof are preferred. Isoprene is the most preferred monomer, in particular for application in adhesive formulations.

It will be appreciated that in the reaction scheme $B_2$ and $B_3$ may be derived from either the same conjugated diene or different conjugated dienes. Accordingly, when S and S' represent polystyrene blocks, I and I' represent polyisoprene blocks and Bu and Bu' represent polybutadiene blocks, the following compositions of tri- and diblock copolymer are possible:

| | |
|---|---|
| S-I-I'-S'/I'-S' | S-Bu-Bu'-S'/Bu'-S' |
| S-I-Bu'-S'/Bu'-S' | S-Bu-I'-S'/I'-S' |

Also included are the compositions comprising a tri- and a diblock copolymer, wherein $B_2$ and/or $B_3$ are random or tapered copolymer blocks derived from different conjugated diene monomers.

For instance, $B_2$ and/or $B_3$ may be derived from randomly copolymerized butadiene and isoprene. Alternatively, the blocks $B_2$ and $B_3$ may represent polybutadiene blocks having different degrees of 1,2-polymerization (1,2-vinyl contents). Block $B_2$ may e.g. have a low 1,2-vinyl content, while block $B_3$ has a high 1,2-vinyl content. This can be achieved by adding a structure modifier together with the second portion of organolithium initiator. It is however preferred that the blocks $B_2$ and $B_3$ are both homopolymer blocks derived from the same conjugated diene.

The inert hydrocarbon solvent may be any solvent known in the an to be suitably applied as a polymerization solvent. Examples of suitable inert hydrocarbon solvents are cyclic aliphatic hydrocarbons such as cyclohexane and cyclopentane, and mixtures thereof with linear or branched aliphatic hydrocarbons such as n-hexane and isopentane. Particularly suitable are cyclohexane, cyclohexane/n-hexane mixtures, cyclohexane/isopentane/n-hexane mixtures, cyclopentane and cyclopentane/isopentane mixtures.

Cyclohexane/isopentane/n-hexane mixtures, cyclohexane and cyclopentane are preferred.

The organolithium initiator may be any organic lithium compound which is commonly known to act as an initiator in polymerization reactions. A preferred class of organolithium compound are alkyl lithium compounds, wherein the alkyl group may be a linear alkyl group or a cycloalkyl group. Preferred alkyl lithium compounds are n-butyl lithium and sec-butyl lithium, with sec-butyl lithium being most preferred.

As the terminating agent commonly known active hydrogen compounds such as water, alcohols, phenols and carboxylic acids may be used. In this case alcohols are preferred, of which methanol and ethanol are most preferred.

If butadiene is used as the conjugated diene monomer, small amounts of structure modifiers, such as ethers and tertiary amines, may be present in the reaction mixture for regulating the degree of 1,2-polymerization. Such structure modifiers may be either present during the whole polymerization process or during only a part thereof, most suitably the second part, i.e. after reinitiation.

The polymerization reactions at the different stages of the process may be carded out at equal or different temperatures within the range of from −10° C. to 150° C., preferably 10° C. to 100° C. The reaction pressure is not bound to any particular value, but should only be sufficient to maintain the reaction mixture in the liquid phase.

The present invention also relates to a block copolymer composition comprising:

(i) a triblock copolymer A-B-B'-A' having two different or equal polymer endblocks A and A' derived from vinyl aromatic monomer and one polymer midblock B-B' derived from conjugated diene monomer, and (ii) a diblock copolymer B'-A' having one polymer block B' derived from conjugated diene monomer and one polymer block A' derived from vinyl aromatic monomer, wherein the molar weight ratio A'(triblock)/A'(diblock) is in the range of from 0.9 to 1.1, wherein both block copolymers are obtained by sequential polymerization and wherein the triblock copolymer as well as the diblock copolymer have a vinyl aromatic content of 55% by weight or less based on the total weight of the triblock copolymer and diblock copolymer, respectively.

It is preferred that the vinyl aromatic polymer block of the diblock copolymer is substantially identical to at least one of the vinyl aromatic polymer blocks of the triblock copolymer. In other words, the molar weight ratio A'(triblock)/A'(diblock) preferably is from 0.95 to 1.05 and most preferably is equal to 1.

It is preferred that the molar weight ratio B'/B-B' is from 0.3 to 0.7, preferably 0.45 to 0.55 and most preferably is equal to 0.5.

In principle, the weight ratio between triblock and diblock copolymer is not bound to any particular value. It is however preferred that this ratio is from 0.01 to 100, preferably 0.1 to 50 and even more preferably 0.2 to 20.

With the term "apparent molecular weight" as used throughout this specification, the molecular weight of a polymer, except polystyrene itself, as measured with gel permeation chromatography (GPC) using polystyrene calibration standards is meant.

The vinyl aromatic contents of the tri- and diblock copolymer may vary over a wide range. However, as the block copolymer composition according to the invention is most suitably applied in adhesive formulations, the vinyl aromatic content should not be too high, i.e. should not exceed 55% by weight based on the total weight of block copolymer. More particularly, the vinyl aromatic content of both tri- and diblock copolymer is preferably from 10 to 50% by weight, more preferably from 12 to 40% by weight and most preferably from 14 to 35% by weight. The vinyl aromatic contents of both triblock and diblock copolymer may be the same or different, but it is preferred that they are the same.

The molecular weight of the vinyl aromatic polymer blocks is not bound to specific values, but may suitably be from 5,000 to 30,000, preferably 8,000 to 20,000. The apparent molecular weight of the triblock copolymer may suitably be from 50,000 to 400,000, preferably 80,000 to 250,000.

The most preferred vinyl aromatic monomer is styrene, while the conjugated diene monomer preferably is selected from butadiene, isoprene and mixtures thereof with isoprene being most preferred.

The invention is further illustrated by the following examples without restricting the scope of the invention to these particular embodiments. In these examples the molecular weight of the block copolymers prepared is determined by Gel Permeation Chromatography (GPC) using polystyrene calibration standards as described in ASTM D 3536. The polystyrene content of the block copolymers is determined according to the method described in ASTM D 3314. From the data obtained by these methods other data such as the molar weight ratio I'/II' and the styrene weight ratio triblock-/diblock are derived.

EXAMPLE 1

A block copolymer composition comprising a styrene-isoprene-styrene triblock copolymer (SII'S') and a styrene-isoprene riblock copolymer (S'I'), wherein:

(a) both block copolymers had a target styrene content of 15% by weight; and (b) the target weight ratio triblock/diblock was 85/15; was prepared as follows.

Step (1): 38 g of styrene was added to 4675 g of cyclohexane at 50° C., after which 3.55 mmol of sec-butyl lithium (s-BuLi) was added. The polymerization was complete after 38 minutes (99% conversion).

Step (2): The temperature was raised to 60° C. and 215 g of isoprene was added. The polymerization was allowed to proceed 24 minutes (99% conversion).

Step (3): A second portion of s-BuLi (1.25 mmol) was added, followed by 291 g of isoprene. The polymerization was allowed to proceed for 25 minutes (99% conversion).

Step (4): A final portion of 51 g of styrene was added and polymerization was allowed to proceed for 17 minutes (99% conversion).

Step (5): 5.35 mmol of ethanol was added as a terminating agent to quench the styrenyl anion.

The product was isolated by steam stripping to give whim crumbs. Analysis with GPC revealed the following results as to the (apparent) molecular weight of the different polymer blocks:

| Step (1) | MW S    | 10700  | [====] |       |
|----------|---------|--------|--------|-------|
| Step (2) | MW SI   | 110300 | [====] |-----  |
| Step (3) | MW SII' | 214900 | [====] |------ |
|          | MW I'   | 109800 |        |       |
| Step (4) | MW SII'S'| 224800| [====] |------[===]|
|          | MM I'S' | 119190 |        |--[===]|

Further analysis of the block copolymer composition showed that the styrene content of both triblock and riblock copolymer was 15% by weight, that both S' blocks of the triblock and riblock copolymer were identical, that the molar weight ratio I'/II' was 0.5 and that the styrene weight ratio triblock/diblock was 85/15.

EXAMPLE 2

A block copolymer composition comprising a styrene-butadiene-styrene triblock copolymer (SBB' S') and a styrene-butadiene diblock copolymer (S'B'), wherein:

(a) both block copolymers had a target styrene content of 15% by weight; and (b) the target weight ratio triblock/diblock was 85/15; and was prepared in a similar way as described in Example 1, using the following amounts of monomer and initiator:

Step (1): 75 g styrene and 4.84 mmol s-BuLi
Step (2): 175 g butadiene
Step (3): 1.68 mmol s-BuLi and 237 g butadiene
Step (4): 101 g styrene Analysis with GPC revealed the following results as to the (apparent) molecular weight of the different polymer blocks:

| S      | 15496  |      |       |
|--------|--------|------|-------|
| SB     | 83050  |      |       |
| SBB'   | 151000 | B'   | 71800 |
| SBB'S' | 165500 | B'S' | 85790 |

Further analysis of these results showed that the styrene content of both triblock and diblock copolymer was 15% by weight, that both S' blocks of the triblock and diblock copolymer were identical, that the molar weight ratio B'/BB' was 0.5 and that the styrene weight ratio triblock/diblock was 85/15.

EXAMPLE 3

A block copolymer composition comprising a styrene-butadiene-styrene triblock copolymer (SBB'S') and a styrene-butadiene riblock copolymer (S'B'), wherein:

(a) the triblock copolymer had a target styrene content of 25% by weight;

(b) the diblock copolymer had a target styrene content of 40% by weight; and (c) the target weight ratio triblock/diblock was 70/30 was prepared in a similar way as described in Example 1, using the following amounts of monomer and initiator:

Step (1): 75 g styrene and 4.84 mmol s-BuLi
Step (2): 337 g butadiene
Step (3): 6.636 mmol s-BuLi and 267 g butadiene
Step (4): 178 g styrene Analysis with GPC revealed the following results as to the (apparent) molecular weight of the different polymer blocks:

| S      | 15600  |      |       |
|--------|--------|------|-------|
| SB     | 145600 |      |       |
| SBB'   | 201000 | B'   | 51500 |
| SBB'S' | 214150 | B'S' | 65510 |

Further analysis of these results showed that the styrene content of the triblock copolymer was 25% by weight, that the styrene content of the diblock copolymer was 40% by weight, that both S' blocks of the triblock and diblock copolymer were identical, that the molar weight ratio B'/BB' was 0.37 and that the styrene weight ratio triblock/diblock was 60/40.

We claim:

1. Process for the preparation of a block copolymer composition, which process comprises the subsequent steps of:

(1) polymerizing vinyl aromatic monomer in an inert hydrocarbon solvent in the presence of an organolithium initiator until substantially complete conversion to first vinyl aromatic blocks of a triblock copolymer;

(2) adding conjugated diene monomer to the polymerization mixture and allowing said conjugated diene monomer to polymerize until substantially complete conversion to first conjugated diene blocks of the triblock copolymer;

(3) adding a second portion of organolithium initiator, followed by the addition of a second portion of conjugated diene monomer and allowing said conjugated diene monomer to polymerize until substantially complete conversion to both second conjugated diene blocks of the triblock copolymer and conjugated diene blocks of a diblock copolymer, wherein the combination of the first and second conjugated diene blocks of the triblock copolymer forms conjugated diene midblocks of the triblock copolymer;

(4) adding a second portion of vinyl aromatic monomer and allowing said vinyl aromatic monomer to polymerize until substantially complete conversion to both second vinyl aromatic blocks of the triblock copolymer and vinyl aromatic blocks of the diblock copolymer; and (5) adding a terminating agent.

2. The process according to claim 1, wherein the amount of conjugated diene added in step (3) is such that the molar weight ratio between the conjugated diene blocks of the diblock copolymer and the conjugated diene midblocks of the triblock copolymer is from 0.3 to 0.7.

3. The process according to claim 2, wherein the amount of conjugated diene added in step (3) is such that the molar weight ratio between the conjugated diene blocks of the diblock copolymer and the conjugated diene midblocks of the triblock copolymer is 0.5.

4. The process according to claim 3, wherein the vinyl aromatic monomer is styrene.

5. The process according to claim 4, wherein the conjugated diene monomer is selected from butadiene, isoprene and mixtures thereof.

6. The process according to claim 5, wherein the conjugated diene monomer is isoprene.

7. The process according to claim 6, wherein the inert hydrocarbon is selected from cyclohexane/n-hexane/isopentane mixtures, cyclohexane and cyclopentane.

* * * * *